US007453445B2

(12) United States Patent
Amundson

(10) Patent No.: US 7,453,445 B2
(45) Date of Patent: Nov. 18, 2008

(54) METHODS FOR DRIVING ELECTRO-OPTIC DISPLAYS

(75) Inventor: Karl R. Amundson, Cambridge, MA (US)

(73) Assignee: E Ink Corproation, Cambridge, MA (US)

( * ) Notice: Subject to any disclaimer, the term of this patent is extended or adjusted under 35 U.S.C. 154(b) by 0 days.

(21) Appl. No.: 11/461,084

(22) Filed: Jul. 31, 2006

(65) Prior Publication Data

US 2006/0262060 A1 Nov. 23, 2006

Related U.S. Application Data

(63) Continuation-in-part of application No. 11/161,715, filed on Aug. 13, 2005.

(60) Provisional application No. 60/595,729, filed on Aug. 1, 2005, provisional application No. 60/522,393, filed on Sep. 24, 2004, provisional application No. 60/522,372, filed on Sep. 21, 2004, provisional application No. 60/601,242, filed on Aug. 13, 2004.

(51) Int. Cl.
*G06F 3/041* (2006.01)

(52) U.S. Cl. ...................................... 345/173; 345/178

(58) Field of Classification Search .................. 345/87, 345/107, 89, 214, 36, 48, 77, 84, 204, 210, 345/173, 178, 88; 356/479; 323/309; 715/716
See application file for complete search history.

(56) References Cited

U.S. PATENT DOCUMENTS

| | | | | |
|---|---|---|---|---|
| 3,668,106 A | | 6/1972 | Ota | |
| 3,756,693 A | | 9/1973 | Ota | |
| 3,767,392 A | | 10/1973 | Ota | |
| 3,792,308 A | | 2/1974 | Ota | |
| 3,870,517 A | | 3/1975 | Ota et al. | |
| 3,892,568 A | | 7/1975 | Ota | |
| 3,972,040 A | | 7/1976 | Hilsum et al. | |
| 4,041,481 A | | 8/1977 | Sato | |
| 4,418,346 A | | 11/1983 | Batchelder | |
| 4,430,648 A | | 2/1984 | Togashi et al. | |
| 4,450,440 A | | 5/1984 | White | |
| 4,689,563 A | * | 8/1987 | Bottomley et al. | 324/309 |
| 4,741,604 A | | 5/1988 | Kornfeld | |
| 4,746,917 A | | 5/1988 | DiSanto et al. | |
| 4,833,464 A | | 5/1989 | DiSanto et al. | |
| 4,947,157 A | | 8/1990 | DiSanto et al. | |
| 4,947,159 A | | 8/1990 | DiSanto et al. | |
| 5,010,327 A | | 4/1991 | Wakita et al. | |
| 5,066,946 A | | 11/1991 | DiSanto et al. | |
| 5,177,475 A | | 1/1993 | Stephany et al. | |
| 5,223,115 A | | 6/1993 | DiSanto et al. | |
| 5,247,290 A | | 9/1993 | DiSanto et al. | |
| 5,254,981 A | | 10/1993 | DiSanto et al. | |
| 5,266,937 A | | 11/1993 | DiSanto et al. | |
| 5,293,528 A | | 3/1994 | DiSanto et al. | |
| 5,302,235 A | | 4/1994 | DiSanto et al. | |
| 5,412,398 A | | 5/1995 | DiSanto et al. | |
| 5,467,107 A | | 11/1995 | DiSanto et al. | |
| 5,467,217 A | | 11/1995 | Check, III | |
| 5,499,038 A | | 3/1996 | DiSanto et al. | |
| 5,654,732 A | | 8/1997 | Katakura | |
| 5,684,501 A | | 11/1997 | Knapp et al. | |
| 5,689,282 A | | 11/1997 | Wolfs et al. | |
| 5,717,515 A | | 2/1998 | Sheridon | |
| 5,739,801 A | | 4/1998 | Sheridon | |
| 5,745,094 A | | 4/1998 | Gordon, II et al. | |
| 5,760,761 A | | 6/1998 | Sheridon | |
| 5,777,782 A | | 7/1998 | Sheridon | |
| 5,808,783 A | | 9/1998 | Crowley | |
| 5,872,552 A | | 2/1999 | Gordon, II et al. | |
| 5,892,504 A | | 4/1999 | Knapp | |
| 5,896,117 A | | 4/1999 | Moon | |
| 5,930,026 A | | 7/1999 | Jacobson et al. | |
| 5,933,203 A | | 8/1999 | Wu et al. | |
| 5,961,804 A | | 10/1999 | Jacobson et al. | |
| 5,963,456 A | | 10/1999 | Klein et al. | |
| 5,978,052 A | | 11/1999 | Ilcisin et al. | |
| 6,002,384 A | | 12/1999 | Tamai et al. | |

(Continued)

FOREIGN PATENT DOCUMENTS

DE 25 23 763 12/1976

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ:2005.

(Continued)

*Primary Examiner*—Prabodh Dharia
(74) *Attorney, Agent, or Firm*—David J. Cole

(57) ABSTRACT

An electro-optic display is driven using a plurality of different drive schemes. The waveforms of the drive schemes are chosen such that the absolute value of the net impulse applied to a pixel for all homogeneous and heterogeneous irreducible loops divided by the number of transitions in the loop is less than about 20 percent of the characteristic impulse (i.e., the average of the absolute values of the impulses required to drive a pixel between its two extreme optical states).

20 Claims, No Drawings

U.S. PATENT DOCUMENTS 6,002,480 A * 12/1999 Izatt et al. .................. 356/479
6,017,584 A 1/2000 Albert et al.
6,034,807 A 3/2000 Little et al.
6,054,071 A 4/2000 Mikkelsen, Jr.
6,055,091 A 4/2000 Sheridon et al.
6,055,180 A 4/2000 Gudesen et al.
6,057,814 A 5/2000 Kalt
6,064,410 A 5/2000 Wen et al.
6,067,185 A 5/2000 Albert et al.
6,081,285 A 6/2000 Wen et al.
6,097,531 A 8/2000 Sheridon
6,118,426 A 9/2000 Albert et al.
6,120,588 A 9/2000 Jacobson
6,120,839 A 9/2000 Comiskey et al.
6,124,851 A 9/2000 Jacobson
6,128,124 A 10/2000 Silverman
6,130,773 A 10/2000 Jacobson et al.
6,130,774 A 10/2000 Albert et al.
6,137,467 A 10/2000 Sheridon et al.
6,144,361 A 11/2000 Gordon, II et al.
6,147,791 A 11/2000 Sheridon
6,154,190 A 11/2000 Yang et al.
6,172,798 B1 1/2001 Albert et al.
6,177,921 B1 1/2001 Comiskey et al.
6,184,856 B1 2/2001 Gordon, II et al.
6,211,998 B1 4/2001 Sheridon
6,225,971 B1 5/2001 Gordon, II et al.
6,232,950 B1 5/2001 Albert et al.
6,236,385 B1 5/2001 Nomura et al.
6,239,896 B1 5/2001 Ikeda
6,241,921 B1 6/2001 Jacobson et al.
6,249,271 B1 6/2001 Albert et al.
6,252,564 B1 6/2001 Albert et al.
6,262,706 B1 7/2001 Albert et al.
6,262,833 B1 7/2001 Loxley et al.
6,271,823 B1 8/2001 Gordon, II et al.
6,300,932 B1 10/2001 Albert
6,301,038 B1 10/2001 Fitzmaurice et al.
6,312,304 B1 11/2001 Duthaler et al.
6,312,971 B1 11/2001 Amundson et al.
6,320,565 B1 11/2001 Albu et al.
6,323,989 B1 11/2001 Jacobson et al.
6,327,072 B1 12/2001 Comiskey et al.
6,330,054 B1 12/2001 Ikami
6,348,908 B1 2/2002 Richley et al.
6,359,605 B1 3/2002 Knapp et al.
6,373,461 B1 4/2002 Hasegawa et al.
6,376,828 B1 4/2002 Comiskey
6,377,387 B1 4/2002 Duthaler et al.
6,392,785 B1 5/2002 Albert et al.
6,392,786 B1 5/2002 Albert
6,407,763 B1 6/2002 Yamaguchi et al.
6,413,790 B1 7/2002 Duthaler et al.
6,421,033 B1 7/2002 Williams et al.
6,422,687 B1 7/2002 Jacobson
6,441,371 B1 * 8/2002 Ahn et al. .................. 250/306
6,445,374 B2 9/2002 Albert et al.
6,445,489 B1 9/2002 Jacobson et al.
6,459,418 B1 10/2002 Comiskey et al.
6,462,837 B1 10/2002 Tone
6,473,072 B1 10/2002 Comiskey et al.
6,480,182 B2 11/2002 Turner et al.
6,498,114 B1 12/2002 Amundson et al.
6,504,524 B1 1/2003 Gates et al.
6,506,438 B2 1/2003 Duthaler et al.
6,512,354 B2 1/2003 Jacobson et al.
6,515,649 B1 2/2003 Albert et al.
6,518,949 B2 2/2003 Drzaic
6,521,489 B2 2/2003 Duthaler et al.
6,531,997 B1 3/2003 Gates et al.
6,535,197 B1 3/2003 Comiskey et al.
6,538,801 B2 3/2003 Jacobson et al.
6,545,291 B1 4/2003 Amundson et al.
6,580,545 B2 6/2003 Morrison et al.
6,639,578 B1 10/2003 Comiskey et al.
6,652,075 B2 11/2003 Jacobson
6,657,772 B2 12/2003 Loxley
6,664,944 B1 12/2003 Albert et al.
D485,294 S 1/2004 Albert
6,672,921 B1 1/2004 Liang et al.
6,680,725 B1 1/2004 Jacobson
6,683,333 B2 1/2004 Kazlas et al.
6,693,620 B1 2/2004 Herb et al.
6,704,133 B2 3/2004 Gates et al.
6,710,540 B1 3/2004 Albert et al.
6,721,083 B2 4/2004 Jacobson et al.
6,724,519 B1 4/2004 Comiskey et al.
6,727,881 B1 4/2004 Albert et al.
6,738,050 B2 5/2004 Comiskey et al.
6,750,473 B2 6/2004 Amundson et al.
6,753,999 B2 6/2004 Zehner et al.
6,788,449 B2 9/2004 Liang et al.
6,816,147 B2 11/2004 Albert
6,819,471 B2 11/2004 Amundson et al.
6,822,782 B2 11/2004 Honeyman et al.
6,825,068 B2 11/2004 Denis et al.
6,825,829 B1 11/2004 Albert et al.
6,825,970 B2 11/2004 Goenaga et al.
6,831,769 B2 12/2004 Holman et al.
6,839,158 B2 1/2005 Albert et al.
6,842,167 B2 1/2005 Albert et al.
6,842,279 B2 1/2005 Amundson
6,842,657 B1 1/2005 Drzaic et al.
6,850,252 B1 * 2/2005 Hoffberg .................... 715/716
6,864,875 B2 3/2005 Drzaic et al.
6,865,010 B2 3/2005 Duthaler et al.
6,866,760 B2 3/2005 Paolini, Jr. et al.
6,870,657 B1 3/2005 Fitzmaurice et al.
6,870,661 B2 3/2005 Pullen et al.
6,900,851 B2 5/2005 Morrison et al.
6,922,276 B2 7/2005 Zhang et al.
6,950,220 B2 9/2005 Abramson et al.
6,958,848 B2 10/2005 Cao et al.
6,967,640 B2 11/2005 Albert et al.
6,980,196 B1 12/2005 Turner et al.
6,982,178 B2 12/2005 LeCain et al.
6,987,603 B2 1/2006 Paolini, Jr. et al.
6,995,550 B2 2/2006 Jacobson et al.
7,002,728 B2 2/2006 Pullen et al.
7,012,600 B2 * 3/2006 Zehner et al. ............... 345/214
7,012,735 B2 3/2006 Honeyman et al.
7,023,420 B2 4/2006 Comiskey et al.
7,030,412 B1 4/2006 Drzaic et al.
7,030,854 B2 4/2006 Baucom et al.
7,034,783 B2 4/2006 Gates et al.
7,038,655 B2 5/2006 Herb et al.
7,061,663 B2 6/2006 Cao et al.
7,071,908 B2 * 7/2006 Guttag et al. ................. 345/87
7,071,913 B2 7/2006 Albert et al.
7,075,502 B1 7/2006 Drzaic et al.
7,075,703 B2 7/2006 O'Neil et al.
7,079,305 B2 7/2006 Paolini, Jr. et al.
2001/0026260 A1 10/2001 Yoneda et al.
2002/0005832 A1 1/2002 Katase
2002/0033784 A1 3/2002 Machida et al.
2002/0033793 A1 3/2002 Machida et al.
2002/0060321 A1 5/2002 Kazlas et al.
2002/0090980 A1 7/2002 Wilcox et al.
2002/0113770 A1 8/2002 Jacobson et al.
2002/0180687 A1 12/2002 Webber
2002/0196207 A1 12/2002 Machida et al.
2002/0196219 A1 12/2002 Matsunaga et al.
2003/0011560 A1 1/2003 Albert et al.
2003/0058223 A1 3/2003 Tracy et al.

| | | | |
|---|---|---|---|
| 2003/0063076 | A1 | 4/2003 | Machida et al. |
| 2003/0102858 | A1 | 6/2003 | Jacobson et al. |
| 2003/0151702 | A1 | 8/2003 | Morrison et al. |
| 2003/0214695 | A1 | 11/2003 | Abramson et al. |
| 2003/0222315 | A1 | 12/2003 | Amundson et al. |
| 2004/0014265 | A1 | 1/2004 | Kazlas et al. |
| 2004/0051934 | A1 | 3/2004 | Machida et al. |
| 2004/0075634 | A1 | 4/2004 | Gates |
| 2004/0094422 | A1 | 5/2004 | Pullen et al. |
| 2004/0105036 | A1 | 6/2004 | Danner et al. |
| 2004/0112750 | A1 | 6/2004 | Jacobson et al. |
| 2004/0119681 | A1 | 6/2004 | Albert et al. |
| 2004/0120024 | A1 | 6/2004 | Chen et al. |
| 2004/0136048 | A1 | 7/2004 | Arango et al. |
| 2004/0155857 | A1 | 8/2004 | Duthaler et al. |
| 2004/0180476 | A1 | 9/2004 | Kazlas et al. |
| 2004/0183759 | A1 | 9/2004 | Stevenson et al. |
| 2004/0190114 | A1 | 9/2004 | Jacobson et al. |
| 2004/0190115 | A1 | 9/2004 | Liang et al. |
| 2004/0196215 | A1 | 10/2004 | Duthaler et al. |
| 2004/0226820 | A1 | 11/2004 | Webber et al. |
| 2004/0239614 | A1 | 12/2004 | Amundson et al. |
| 2004/0246562 | A1 | 12/2004 | Chung et al. |
| 2004/0252360 | A1 | 12/2004 | Webber et al. |
| 2004/0257635 | A1 | 12/2004 | Paolini, Jr. et al. |
| 2004/0263947 | A1 | 12/2004 | Drzaic et al. |
| 2005/0001810 | A1 | 1/2005 | Yakushiji et al. |
| 2005/0001812 | A1 | 1/2005 | Amundson et al. |
| 2005/0007336 | A1 | 1/2005 | Albert et al. |
| 2005/0012980 | A1 | 1/2005 | Wilcox et al. |
| 2005/0017944 | A1 | 1/2005 | Albert |
| 2005/0018273 | A1 | 1/2005 | Honeymoon et al. |
| 2005/0024353 | A1 | 2/2005 | Amundson et al. |
| 2005/0035941 | A1 | 2/2005 | Albert et al. |
| 2005/0062714 | A1 | 3/2005 | Zehner et al. |
| 2005/0067656 | A1 | 3/2005 | Denis et al. |
| 2005/0078099 | A1 | 4/2005 | Amundson et al. |
| 2005/0105159 | A1 | 5/2005 | Paolini, Jr. et al. |
| 2005/0105162 | A1 | 5/2005 | Paolini, Jr, et al. |
| 2005/0122284 | A1 | 6/2005 | Gates et al. |
| 2005/0122306 | A1 | 6/2005 | Wilcox et al. |
| 2005/0122563 | A1 | 6/2005 | Honeymoon et al. |
| 2005/0122564 | A1 | 6/2005 | Zehner et al. |
| 2005/0122565 | A1 | 6/2005 | Doshi et al. |
| 2005/0134554 | A1 | 6/2005 | Albert et al. |
| 2005/0146774 | A1 | 7/2005 | LeCain et al. |
| 2005/0151709 | A1 | 7/2005 | Jacobson et al. |
| 2005/0152018 | A1 | 7/2005 | Abramson et al. |
| 2005/0152022 | A1 | 7/2005 | Honeyman et al. |
| 2005/0156340 | A1 | 7/2005 | Valianatos et al. |
| 2005/0168799 | A1 | 8/2005 | Whitesides et al. |
| 2005/0168801 | A1 | 8/2005 | O'Neil et al. |
| 2005/0179642 | A1 | 8/2005 | Wilcox et al. |
| 2005/0190137 | A1 | 9/2005 | Duthaler et al. |
| 2005/0212747 | A1 | 9/2005 | Amundson |
| 2005/0213191 | A1 | 9/2005 | Whitesides et al. |
| 2005/0219184 | A1 | 10/2005 | Zehner et al. |
| 2005/0253777 | A1 | 11/2005 | Zehner et al. |
| 2005/0270261 | A1 | 12/2005 | Danner et al. |
| 2005/0280626 | A1 | 12/2005 | Amundson et al. |
| 2006/0007527 | A1 | 1/2006 | Paolini, Jr. et al |
| 2006/0007528 | A1 | 1/2006 | Cao et al. |
| 2006/0023296 | A1 | 2/2006 | Whitesides et al. |
| 2006/0024437 | A1 | 2/2006 | Pullen et al. |
| 2006/0038772 | A1 | 2/2006 | Amundson et al. |
| 2006/0139308 | A1 | 6/2006 | Jacobson et al. |
| 2006/0139310 | A1 | 6/2006 | Zehner et al. |
| 2006/0139311 | A1 | 6/2006 | Zehner et al. |
| 2006/0176267 | A1 | 8/2006 | Honeyman et al. |
| 2006/0181492 | A1 | 8/2006 | Gates et al. |
| 2006/0181504 | A1 | 8/2006 | Kawai |
| 2006/0194619 | A1 | 8/2006 | Wilcox et al. |
| 2006/0197737 | A1 | 9/2006 | Baucom et al. |
| 2006/0197738 | A1 | 9/2006 | Kawai |
| 2006/0202949 | A1 * | 9/2006 | Danner et al. ............... 345/107 |
| 2006/0223282 | A1 | 10/2006 | Amundson et al. |
| 2006/0232531 | A1 | 10/2006 | Amundson et al. |
| 2006/0262060 | A1 | 11/2006 | Amundson |
| 2006/0279527 | A1 | 12/2006 | Zehner et al. |
| 2006/0291034 | A1 | 12/2006 | Patry et al. |
| 2007/0035532 | A1 | 2/2007 | Amundson et al. |
| 2007/0035808 | A1 | 2/2007 | Amundson et al. |

FOREIGN PATENT DOCUMENTS

| | | | |
|---|---|---|---|
| EP | 1 099 207 | B1 | 3/2002 |
| EP | 1 145 072 | B1 | 5/2003 |
| EP | 1 462 847 | | 9/2004 |
| EP | 1 482 354 | | 12/2004 |
| EP | 1 484 635 | | 12/2004 |
| EP | 1 500 971 | A1 | 1/2005 |
| EP | 1 501 194 | A1 | 1/2005 |
| EP | 1 536 271 | | 6/2005 |
| EP | 1 542 067 | | 6/2005 |
| EP | 1 577 702 | | 9/2005 |
| EP | 1 577 703 | | 9/2005 |
| EP | 1 598 684 | | 11/2005 |
| JP | 03-091722 | A | 4/1991 |
| JP | 03-096925 | A | 4/1991 |
| JP | 05-173194 | A | 7/1993 |
| JP | 06-233131 | A | 8/1994 |
| JP | 09-016116 | A | 1/1997 |
| JP | 09-185087 | A | 7/1997 |
| JP | 09-230391 | A | 9/1997 |
| JP | 11-113019 | A | 4/1999 |
| WO | WO 99/10870 | | 3/1999 |
| WO | WO 00/36560 | | 6/2000 |
| WO | WO 00/38000 | | 6/2000 |
| WO | WO 00/67110 | | 11/2000 |
| WO | WO 01/07961 | | 2/2001 |
| WO | WO 2004/001498 | | 12/2003 |
| WO | WO 2004/079442 | | 9/2004 |
| WO | WO 2004/090626 | | 10/2004 |
| WO | WO 2004/107031 | | 12/2004 |
| WO | WO 2005/034074 | | 4/2005 |
| WO | WO 2005/052905 | | 6/2005 |
| WO | WO 2005/094519 | | 10/2005 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Antia, M., "Switchable Reflections Make Electronic Ink", Science, 285, 658 (1999).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Eletrophoretic Display on Silicon", SID 04 Digest, 651 (2004).

Caillot, E. et al, "Active Matrix Electrophretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An Electrophoretic ink for all-printed reflective electronic displays", Nature, 394, 253 (1998).

Comiskey, B., et al., "Electrophoretic Ink: A Printable Display Material", Sid 97 Digest (1997), p. 75.

Danner, G.M. et al., "Reliability Performance for Microencapsulated Elecrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).
Hayes, R.A., et al., "Video-Speed Electronic Paper Based Electrowetting", Nature, vol. 425, Sep. 25 pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Hunt, R.W.G., "Measuring Color", 3d. Edn, Fountain Press (ISBN 0 86343 387 1), p. 63 (1998).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
Mossman, M.A., et al., "A New Reflective Color Display Technique Based on Total Internal Reflection and Subtractive Color Filtering", SID 01 Digest, 1054 (2001).
O'Regan, B. et al., "A Low Cost, High-efficiency Solar Cell Based on Dye-Sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Poor, A., "Feed forward makes LCDs Faster", available at "http://www.extremetech.com/article2/0,3973,10085,00.asp" Sep. 24, 2001.
Shiffman, R.R., et al., "An Electrophoretic Image Display with Internal NMOS Address Logic and Display Drivers," Proceedings of the SID, 1984, vol. 25, 105 (1984).
Singer, B., et al., "An X-Y Addressable Electrophoretic Display," Proceedings of the SID, 18, 255 (1977).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

METHODS FOR DRIVING ELECTRO-OPTIC DISPLAYS

REFERENCE TO RELATED APPLICATIONS

This application is a continuation-in-part of copending application Ser. No. 11/161,715, filed Aug. 13, 2005 (Publication No. 2006/0280626), which claims benefit of the following provisional Applications: (a) Application Ser. No. 60/601,242, filed Aug. 13, 2004; (b) Application Ser. No. 60/522,372, filed Sep. 21, 2004; and (c) Application Ser. No. 60/522,393, filed Sep. 24, 2004.

This application also claims benefit of provisional Application Ser. No. 60/595,729, filed Aug. 1, 2005.

This application is related to U.S. Pat. No. 7,012,600 (issued on application Ser. No. 10/065,795, filed Nov. 20, 2002, which itself claims benefit of the following Provisional Applications: (a) Ser. No. 60/319,007, filed Nov. 20, 2001; (b) Ser. No. 60/319,010, filed Nov. 21, 2001; (c) Ser. No. 60/319,034, filed Dec. 18, 2001; (d) Ser. No. 60/319,037, filed Dec. 20, 2001; and (e) Ser. No. 60/319,040, filed Dec. 21, 2001). Application Ser. No. 10/065,795 is also a continuation-in-part of application Ser. No. 09/561,424, filed Apr. 28, 2000 (now U.S. Pat. No. 6,531,997), which is itself a continuation-in-part of application Ser. No. 09/520,743, filed Mar. 8, 2000 (now U.S. Pat. No. 6,504,524). Application Ser. No. 09/520,743 also claims benefit of Provisional Application Ser. No. 60/131,790, filed Apr. 30, 1999.

This application is also related to application Ser. No. 10/814,205, filed Mar. 31, 2004 (Publication No. 2005/0001812), which claims benefit of the following Provisional Applications: (f) Ser. No. 60/320,070, filed Mar. 31, 2003; (g) Ser. No. 60/320,207, filed May 5, 2003; (h) Ser. No. 60/481,669, filed Nov. 19, 2003; (i) Ser. No. 60/481,675, filed Nov. 20, 2003; and (j) Ser. No. 60/557,094, filed Mar. 26, 2004.

This application is also related to application Ser. No. 10/879,335, filed Jun. 29, 2004 (Publication No. 2005/0024353), which claims benefit of the following Provisional Applications: (k) Ser. No. 60/481,040, filed Jun. 30, 2003; (l) Ser. No. 60/481,053, filed Jul. 2, 2003; and (m) Ser. No. 60/481,405, filed Sep. 23, 2003. Application Ser. No. 10/879,335 is also a continuation-in-part of the aforementioned application Ser. No. 10/814,205.

This application is also related to application Ser. No. 10/249,973, filed May 23, 2003 (Publication No. 2005/0270261), which is a continuation-in-part of the aforementioned application Ser. No. 10/065,795. Application Ser. No. 10/249,973 claims priority from Provisional Application Ser. Nos. 60/319,315, filed Jun. 13, 2002 and Ser. No. 60/319,321, filed Jun. 18, 2002.

This application is also related to application Ser. No. 10/904,707, filed Nov. 24, 2004 (Publication No. 2005/0179642), which is a continuation-in-part of the aforementioned application Ser. No. 10/879,335.

This application is also related to copending application Ser. No. 10/063,236, filed Apr. 2, 2002 (Publication No. 2002/0180687).

The entire contents of these copending applications, and of all other U.S. patents and published and copending applications mentioned below, are herein incorporated by reference.

BACKGROUND OF INVENTION

This invention relates to methods for driving electro-optic displays, especially bistable electro-optic displays, and to apparatus for use in such methods. More specifically, this invention relates to driving methods which are intended to enable a plurality of drive schemes to be used simultaneously to update an electro-optic display. This invention is especially, but not exclusively, intended for use with particle-based electrophoretic displays in which one or more types of electrically charged particles are suspended in a liquid and are moved through the liquid under the influence of an electric field to change the appearance of the display.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in the aforementioned 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically, as illustrated below, such a waveform will comprise a plurality of waveform elements; where these elements are essentially rectangular (i.e., where a given element comprises application of a constant voltage for a period of time);

the elements may be called "pulses" or "drive pulses". The term "drive scheme" denotes a set of waveforms sufficient to effect all possible transitions between gray levels for a specific display.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038 and 6,870,657, and in U.S. Patent Application 2003/0214695. This type of medium is also typically bistable.

Another type of electro-optic display is an electro-wetting display developed by Philips and described in an article in the Sep. 25, 2003 issue of the Journal "Nature" and entitled "Performing Pixels: Moving Images on Electronic Paper", Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854; 7,034,783; 7,038,655; 7,061,663; 7,071,913; 7,075,502; 7,075,703; and 7,079,305; and U.S. Patent Applications Publication Nos. 2002/0060321; 2002/0090980; 2002/0113770; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0257635; 2004/0263947; 2005/0000813; 2005/0001812; 2005/0007336; 2005/0012980; 2005/0017944; 2005/0018273; 2005/0024353; 2005/0062714; 2005/0067656; 2005/0078099; 2005/0099672; 2005/0105159; 2005/0122284; 2005/0122306; 2005/0122563; 2005/0122564; 2005/0122565; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0023296; 2006/0024437; and 2006/0038772; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required that longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^*=116(R/R_0)^{1/3}-16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, typically the two extreme optical states of each pixel, the MDS providing quicker rewriting of the display that the GSDS. The MDS is used when all the pixels which are being changed during a rewriting of the display are effecting transitions only between the two gray levels used by the MDS. For example, the aforementioned 2005/0001812 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

A display may usefully use more than two drive schemes. For example, a display may have one GSDS which is used for updating small areas of the display and a second GSDS which is used when the entire image on the display needs to be changed or refreshed. For example, a user editing small portions of a drawing shown on a display might use a first GSDS (which does not require flashing of the display) to view the results of the edits, but might use a second "clearing" GSDS (which does involve flashing of the display) to show more accurately the final edited drawing, or to display a new drawing on the display. In such a scheme, the second GSDS may be referred to a "gray scale clear" drive scheme or "GSCDS".

As discussed in detail in the aforementioned 2005/0001812, for at least some types of electro-optic displays it is desirable that the drive scheme used be DC balanced, in the sense that, for any series of transitions beginning and ending at the same gray level, the algebraic sum of the impulses applied during the series of transitions is bounded. DC balanced drive schemes have been found to provide more stable display performance and reduced image artifacts. Desirably all individual waveforms within a drive scheme are DC balanced, but in practice it is difficult to make all waveforms DC balanced, so that drive schemes are usually a mixture of DC balanced and DC imbalanced waveforms, even though the drive scheme as a whole is DC balanced.

Use of two such mixed DC balanced drive schemes in the same display may result in a DC imbalanced overall drive scheme because of transition loops using transitions from both drive schemes. For example, consider a display using a MDS and a GSDS, and a simple transition loop, white-black-white. The GSDS may have a net impulse of $I_1$ for the white-black (W→B) transition and (since it is DC balanced) a net impulse of $-I_1$ for the B→W transition. Similarly, the MDS may have a net impulse of $I_2$ (not equal to $I_1$) for the white-black (W→B) transition and (since it is DC balanced) a net impulse of $-I_2$ for the B→W transition. If a pixel is driven from white to black using the GSDS and then from black to white using the MDS, the net impulse for the loop is $I_1 - I_2$, which is not equal to zero. Furthermore, since this same loop can be repeated indefinitely, the net impulses for the loop can accumulate, so that the net impulse is unbounded and the overall drive scheme is no longer DC balanced.

The present invention provides an electro-optic display, and a method for operating such a display, which allows two different drive schemes to be used simultaneously in a manner which ensures that the overall drive scheme is DC balanced, or very close to DC balanced.

SUMMARY OF INVENTION

This invention provides a method of driving an electro-optic display using a plurality of different drive schemes, the waveforms of the drive schemes being chosen such that the absolute value of the net impulse applied to a pixel for all homogeneous and heterogeneous irreducible loops divided by the number of transitions in the loop is less than about 20 percent of the characteristic impulse, wherein:

a homogeneous irreducible loop is a sequence of gray levels, starting at a first gray level, passing through zero or more gray levels, and ending at the first gray level, wherein all transitions are effected using the same drive scheme, and wherein the loop does not visit any gray level except the first gray level more than once;

a heterogeneous irreducible loop is a sequence of gray levels, starting at a first gray level, passing through one or more gray levels and ending at the first gray level, wherein the loop comprises transitions using at least two different drive schemes, the drive scheme used to effect the last transition in the loop is the same as the drive scheme used to effect the transition to the first gray level immediately prior to the start of the loop, and the loop comprises no shorter irreducible loops; and the characteristic impulse is the average of the absolute values of the impulses required to drive a pixel between its two extreme optical states.

Desirably, the net impulse applied to a pixel for all homogeneous and heterogeneous irreducible loops (as defined below) divided by the number of transitions in the loop is less than about 10 percent, and preferably less than about 5 percent, of the characteristic impulse. Most desirably, the net impulse for all homogeneous and heterogeneous irreducible loops is essentially zero, i.e., all such loops are DC balanced.

In the present method, the plurality of drive schemes may comprise a gray scale drive scheme and a monochrome drive scheme, or two gray scale drive schemes and a monochrome drive scheme. In the latter case, one of the two gray scale drive schemes may use local updating of the image and the other may use global updating. Alternatively, one of the two gray scale drive schemes may provide more accurate gray levels than the other but cause more flashing of the display.

The present method may make use of any of the types of electro-optic medium discussed above. Thus, for example, the electro-optic display may comprise a rotating bichromal member, electrochromic or electrowetting display medium. Alternatively, the electro-optic display may comprise a particle-based electrophoretic medium in which a plurality of charged particles move through a fluid under the influence of an electric field. The charged particles and the fluid may be encapsulated within a plurality of capsules or microcells, or may be present as a plurality of discrete droplets within a continuous phase comprising a polymeric binder. The fluid may be gaseous.

This invention extends to an electro-optic display comprising a layer of electro-optic medium, at least one electrode arranged to apply an electric field to the layer of electro-optic medium, and a controller arranged to control the electric field applied to the electro-optic medium by the at least one electrode, the controller being arranged to carry out a method of the present invention.

The displays of the present invention may be used in essentially any application in which electro-optic displays have previously been used, for example electronic book readers, portable computers, tablet computers, cellular telephones, smart cards, signs, watches, shelf labels and flash drives.

DETAILED DESCRIPTION

As already mentioned, this invention provides a method of driving an electro-optic display using a plurality of different drive schemes, the waveforms of the drive schemes being chosen such that the absolute value of the net impulse applied to a pixel for all homogeneous and heterogeneous irreducible loops divided by the number of transitions in the loop is less than about 20 percent of the characteristic impulse.

The present invention is based upon the concepts of homogeneous and heterogeneous irreducible loops. For present purposes, a gray level loop is a sequence of gray levels where the first and last gray levels are the same. For example, assuming a four gray level (two-bit) gray scale, with the gray levels being denoted, from darkest to lightest, 1, 2, 3 and 4, examples of such gray level loops are:

1→1

2→3→2

1→4→3→2→1.

Homogeneous irreducible loops are sequences of gray levels, starting at a first gray level, passing through zero or more gray levels to end up at the first gray level, in which all the transitions are effected using the same drive scheme (typically a gray scale drive scheme or "GSDS"). While in general gray level loops can visit any gray level multiple times, a homogeneous irreducible loop does not visit any gray level more than once, except for the final gray level, which as already noted must be the same as the first gray level. For example, assuming the same four gray level (two-bit) gray scale, homogeneous irreducible loops are:

2→2

3→2→1→3

1→2→3→4→1

The first loop simply transitions from gray level 1 to gray level 1, and the second from gray level 2 to gray level 2. The third example starts at gray level 1, transitions to gray level 2, and then transitions back to gray level 1.

Gray level loops can be homogeneous (i.e., having all transitions effected using the same drive scheme) but not irreducible. Examples of homogeneous loops that are not irreducible are:

1→2→3→2→1

1→2→2→1

3→2→3→2→3

All of these loops are not irreducible because they contain repeated visits to the same gray level other than the first and last gray level, and all can be reduced to a plurality of irreducible loops.

It will readily be apparent that, for any number of gray levels within a gray scale, there are a finite number of homogeneous irreducible loops.

Heterogeneous loops are similar to homogeneous loops except that heterogeneous loops include transitions using at least two different drive schemes. In heterogeneous loops, as in homogeneous ones, the first and last gray levels must be the same; also, in heterogeneous loops, the drive scheme used to effect the last transition of the loop must be the same as the drive scheme previously used to effect the transition to the first gray level. By way of example, consider the transition, in the aforementioned four gray level scale, from gray level 1 to gray level 4 using drive scheme A, denoted symbolically as:

1→(a)→4

A reverse transition from gray level 4 to gray level 1 using drive scheme B is denoted symbolically as:

4→(b)→1

A heterogeneous loop can be constructed from these two transitions, thus:

1→(a)→4→(b)→1 where the original gray level 1 state was achieved using drive scheme B as indicated at the end of the loop.

It will readily be apparent that various other heterogeneous loops can be constructed each using a plurality of drive schemes. Irreducible heterogeneous loops can be defined as having the following two properties:

(a) the first and last gray levels are the same, and the drive scheme used to achieve the last gray level is the same as that used to achieve the first gray level; and (b) the heterogeneous loop itself contains no irreducible loops.

Examples of irreducible heterogeneous loops are:

1→(a)→4→(b)→1→(b)→2→(a)→1

1→(a)→4→(b)→1→(c)→4→(d)→1

Examples of heterogeneous loops that are not irreducible are:

1→(a)→4→(a)→1→(b)→4→(a)→1

1→(a)→2→(b)→3→(b)→2→(a)→1 because they contain irreducible loops; the first loop comprises two successive 1→(a)→4→(a)→1 irreducible loops, while the second contains two nested irreducible loops.

It will be appreciated that complex homogeneous loops can be "deconstructed" in a similar manner into finite sets of irreducible loops and irreducible loops embedded within other irreducible loops. Thus, for example, the homogeneous loop:

1→4→3→2→3→2→3→2→1→2→1 can be decomposed into two consecutive 2→3→2 loops embedded within a 1→4→3→2→1, loop, and followed by the loop 1→2→1.

Since both homogeneous and heterogeneous loops can be deconstructed in this manner to combinations of irreducible loops, it follows that if all irreducible loops are DC balanced, all possible loops (i.e., all possible sequences that start and end at the same gray level) are DC balanced.

As already mentioned, where a single display makes use of a plurality of drive schemes, it is advantageous for the overall drive scheme as well as the individual drive schemes to be DC balanced (or, less desirably, substantially DC balanced, in the sense that the algebraic sum of the impulses in any given loop is small). In accordance with the present invention, the drive schemes are chosen so that all homogeneous and heterogeneous irreducible loops are DC balanced, or, in a less preferred form of the invention, all homogeneous and heterogeneous irreducible loops are substantially DC balanced. Substantial DC-balance allows for small DC imbalance in some or all of the homogeneous and heterogeneous loops.

As already mentioned, one preferred form of the present method uses as the plurality of drive schemes a monochrome drive scheme and at least one gray scale drive scheme. As is well known to those skilled in the technology of electro-optic displays, a gray scale drive scheme (GSDS) can be used to make transitions from any gray level to any other gray level in a gray scale. An example of a gray level sequence achieved through the action of a GSDS grayscale update is:

2→(G)3→(G)1→(G)4→(G)3→(G)1→(G)3→(G)3→(G)3→(G)2 where "→(G)" denotes that the relevant transition is effected by the GSDS. This example assumes the aforementioned four gray level (two-bit) gray scale, with the gray levels denoted, from darkest to lightest, 1, 2, 3 and 4.

A monochrome drive scheme (MDS) can be used to effect transitions between gray levels belonging to a monochrome subset of gray levels, the monochrome subset containing two of the gray levels in the aforementioned gray scale. In this example, the monochrome subset is {1,4}, that is, the darkest and lightest gray levels (typically black and white respectively). In any given sequence of gray levels, some of the transitions may be effected by the MDS, while others may be effected by the GSDS. For example, a gray level sequence could be:

2→(G)3→(G)1→(M)4→(M)1→(M)4→(G)3→(G)1→(M)4→(G)2 where "→(M)" denotes that the relevant transition is effected by the MDS. This sequence illustrates heterogeneous updating, that is, updating using combinations of GSDS and MDS.

A particularly preferred embodiment of the present invention uses three different drive schemes, namely a gray scale drive scheme, a gray scale clear drive scheme, and a monochrome drive scheme. The gray scale drive scheme and the gray scale clear drive scheme may differ in various ways; for example, the gray scale drive scheme may use local updating (i.e., only the pixels which need to be changed are rewritten), while the gray scale clear drive scheme may use global updating (i.e., all pixels are rewritten whether or not their gray levels are to change). Alternatively, the gray scale clear drive scheme may provide more accurate gray levels than the gray scale drive scheme but at the cost of more flashing during transitions.

Adjustment of the individual waveforms of the drive schemes used in the present invention to substantially or completely DC balance all irreducible homogeneous and heterogeneous irreducible loops may be effected by any of the techniques described in the various patents and applications referred to in the "Reference to related applications" section above. These techniques including varying the waveform depending upon various prior states of the display (so that, for example, the homogeneous loops 1→2→1 and 1→3→2→1 both end with a 2→1 transition, the waveform used for this 2→1 transition can be different in the two cases), and insert of balanced pulse pairs and other waveform elements which can effect some change in gray level but have zero net impulse.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. A method of driving an electro-optic display using a plurality of different drive schemes, the waveforms of the drive schemes being chosen such that the absolute value of the net impulse applied to a pixel for all homogeneous and heterogeneous irreducible loops divided by the number of transitions in the loop is less than about 20 percent of the characteristic impulse, wherein:

a homogeneous irreducible loop is a sequence of gray levels, starting at a first gray level, passing through zero or more gray levels, and ending at the first gray level, wherein all transitions are effected using the same drive scheme, and wherein the loop does not visit any gray level except the first gray level more than once;

a heterogeneous irreducible loop is a sequence of gray levels, starting at a first gray level, passing through one or more gray levels and ending at the first gray level, wherein the loop comprises transitions using at least two different drive schemes, the drive scheme used to effect the last transition in the loop is the same as the drive scheme used to effect the transition to the first gray level immediately prior to the start of the loop, and the loop comprises no shorter irreducible loops; and the characteristic impulse is the average of the absolute values of the impulses required to drive a pixel between its two extreme optical states.

2. A method according to claim 1 wherein the net impulse applied to a pixel for all homogeneous and heterogeneous irreducible loops divided by the number of transitions in the loop is less than about 10 percent of the characteristic impulse.

3. A method according to claim 2 wherein the net impulse applied to a pixel for all homogeneous and heterogeneous irreducible loops divided by the number of transitions in the loop is less than about 5 percent of the characteristic impulse.

4. A method according to claim 3 wherein the net impulse applied to a pixel for all homogeneous and heterogeneous irreducible loops is essentially zero.

5. A method according to claim 1 wherein the drive schemes comprise a gray scale drive scheme and a monochrome drive scheme.

6. A method according to claim 1 wherein the drive schemes comprise two gray scale drive schemes and a monochrome drive scheme.

7. A method according to claim 6 wherein one of the two gray scale drive schemes uses local updating of the image and the other uses global updating.

8. A method according to claim 6 wherein one of the two gray scale drive schemes provides more accurate gray levels than the other but causes more flashing of the display.

9. A method according to claim 1 wherein the electro-optic display comprises a rotating bichromal member, electrochromic or electrowetting display medium.

10. A method according to claim 1 wherein the electro-optic display comprises a particle-based electrophoretic medium in which a plurality of charged particles move through a fluid under the influence of an electric field.

11. A method according to claim 10 wherein the charged particles and the fluid are encapsulated within a plurality of capsules or microcells.

12. A method according to claim 10 wherein the charged particles and the fluid are present as a plurality of discrete droplets within a continuous phase comprising a polymeric binder.

13. A method according to claim 10 wherein the fluid is gaseous.

14. An electro-optic display comprising a layer of electro-optic medium, least one electrode arranged to apply an electric field to the layer of electro-optic medium, and a controller arranged to control the electric field applied to the electro-optic medium by the at least one electrode, the controller being arranged to carry out a method according to claim 1.

15. A display according to claim 14 wherein the electro-optic display comprises a rotating bichromal member, electrochromic or electrowetting display medium.

16. A display according to claim 14 wherein the electro-optic display comprises a particle-based electrophoretic medium in which a plurality of charged particles move through a fluid under the influence of an electric field.

17. A display according to claim 16 wherein the charged particles and the fluid are encapsulated within a plurality of capsules or microcells.

18. A display according to claim 16 wherein the charged particles and the fluid are present as a plurality of discrete droplets within a continuous phase comprising a polymeric binder.

19. A display according to claim 16 wherein the fluid is gaseous.

20. An electronic book reader, portable computer, tablet computer, cellular telephone, smart card, sign, watch, shelf label or flash drive comprising a display according to claim 14.

* * * * *